June 17, 1969 P. B. CRAIGHEAD ET AL 3,449,872
FIELD HANGAR OR SHELTER
Filed Nov. 7, 1966 Sheet 1 of 7

INVENTOR.
PHILIP B. CRAIGHEAD
FAISAL A. NAFFA
BY
ATTORNEYS

June 17, 1969  P. B. CRAIGHEAD ET AL  3,449,872
FIELD HANGAR OR SHELTER
Filed Nov. 7, 1966  Sheet 3 of 7

INVENTOR.
PHILIP B. CRAIGHEAD
FAISAL A. NAFFA
BY Whittemore Hulbert
Belknap
ATTORNEYS

United States Patent Office 3,449,872
Patented June 17, 1969

3,449,872
FIELD HANGAR OR SHELTER
Philip B. Craighead, Grosse Pointe, and Faisal A. Naffa,
Detroit, Mich., assignors to Brooks & Perkins, Inc.,
Detroit, Mich., a corporation of Delaware
Filed Nov. 7, 1966, Ser. No. 592,368
Int. Cl. E04b 7/16, 1/346
U.S. Cl. 52—66                                    5 Claims

ABSTRACT OF THE DISCLOSURE

A field hangar is disclosed which is capable of erection and dismantling on site from prefabricated roof, side and lift truss components having releasable pin connections of prefabricated units to one another. The roof trusses are articulated in parallel relation to one another by the lift truss structure, prefabricated components of which are pivotally connected to one another to permit flexure relative to one another as the lift and the articulated roof sections are elevated. The roof and side truss components are releasably pin-connected to one another at the top of the latter by pin and slot means permitting a substantial degree of relative movement of the roof and side components as the connecting pins are applied or removed. The entire structure is covered by a sheath, panels of which are overlapped and seamed together, being held onto the side and roof structures, and purlins rigidly connecting trusses thereof to one another, by flexible draw members received in guide formations at the borders of the panels.

Summary of the invention

The present invention relates to structural improvements for use primarily, at least as at present, by the military in the quick and easy erection in situ (and later dismantling and removal, if desired) of an aircraft field hangar or like shelter structure of possibly varying size. However, considerable non-military usage is foreseen as a possibility for the future.

More particularly, the invention relates to structural improvements in component side truss and roof truss assemblies, which are disposed in a longitudinally spaced series when erected, and to improvements in flexible articulated component lift truss assemblies which articulate the roof trusses in parallel, side-by-side relation to one another for lifting (once covered) between the side trusses to the top of the latter. Various specifically improved features of side, roof and lift trusses contribute valuably to ease and speed of field assembly thereof by a relatively small crew.

Thus, improvements in the three assemblies and their mode of connection, both in regard to connections of their component truss parts and their connections to one another, make for an efficient and speedy field operation in these respects. Moreover, improvements in the lift truss assemblies and their flexible connections to the roof truss assemblies insure efficiency, speed and safety against overstressing during and subsequent to the elevation of the roof trusses between the side trusses.

In accordance with the invention, the side and roof trusses are in the form of individual, prefabricated sub-assemblies or units, each of shorter length than the respective assemblies as a whole being connected end-to-end to one another by quickly applied and removed pin means, and each such unit comprising rivet-connected truss lengths of aluminum or other lightweight and suitably strong metal. Suitable plates are employed at the connections, being preferably of steel, particularly where wear is to be experienced, to rivet the various truss units or sub-units together.

Further in accordance with the invention, the field assembly is to a great extent carried out using quick-release coupling pins applied to mating coupling tie plates, ears and/or flanges of the respective successive truss-constituting units. The same is true in regard to factory assembled and shipped roof truss units, also the roof lift truss components. This makes possible a great saving of time and effort in the ground-completion of the individual trusses, prior to erection thereof in a longitudinally spaced series of assemblies, separated at the line of side trusses by intervening bays.

The erected side trusses are fixedly anchored to the earth by base plates beneath uprights of each thereof, each being further braced by a transverse, earth-anchored guy wire attached thereto adjacent the top thereof. Successive trusses are rigidly connected to one another in their longitudinally spaced progression by elongated tubular struts or purlin tubes; and these connections are made very readily and rapidly by again using quick release coupling pins extending through apertures at the purlin tube ends and U-shaped purlin seats rigidly affixed to upright outer parts of the side trusses. Similar purlin connections are made at the roof trrusses, and the connected truss assemblies are further braced and rigidified individually by tubular compression members and solid-section tension rods.

The roof truss assemblies are also individually in the form of pre-fabricated truss units or sub-assemblies of different outline, which are ground assembled in the fashion described above in connection with the side trusses. For example, the invention contemplates, for each complete, side-to-side extending roof truss assembly, two like trusses of four component pre-fabricated units or sub-assemblies each, which trusses when put together, constitute an over-all roof entity. These halves are pin-connected to one another in a final step of completing the full roof truss structure on the ground. As coupled in transversely parallel, longitudinally spaced relation to one another by their purlins and by the improved lift truss structures of the invention, all of the roof trusses are then simultaneously lifted by the crew, employing winches mounted to certain of the side trusses.

As indicated above, the invention contemplates improvements in the lift truss components, as assembled in two longitudinal series at the transverse ends of the roof truss assemblies, to articulate the latter for hoisting in a relatively rapid but safe manner by winch cable, using a crew of minimum size. Thus, two different types of lift truss unit are provided, one of which is intended for a rigid connection at one end thereof to a roof truss disposed at 90° thereto; while another type of lift truss component, as connected rigidly or pivotally to the first, is itself pivotally connected to another roof truss. It is, therefore, in a pivotal relation to the next succeeding lift truss unit of the series.

Accordingly, as winches mounted on selected upright trusses along the sides of the shelter are simultaneously operated in approximate synchronism, under the guidance of a coordinator crew man, some slight degree of vertical movement of one roof truss relative to the next is accommodated by the pivotal lift and roof truss connections, and none of the truss parts are unduly strained, even if the winches are not precisely coordinated. As in the case of the side and roof truss assemblies, these pivotal connections are made by means of quick-release pins, and the pivotal action relieves the lift truss and roof truss assemblies of vertical stress which would be present in the event that all of the lift and roof truss connections were rigid ones. As an example of another aspect of this particular improvement, in a typical shelter having eleven roof trusses separated in equal spacing by ten intervening side truss bays, it is necessary to employ but seven winches at each side for an expeditious and safe hoisting of the entire roof structure into place.

The improvement of the invention contemplates means for the easy, quick and reliable, but releasable, locking of the several roof trusses to the side trusses, once elevated to the tops of the latter. For this purpose, each roof truss has plate means at an end thereof which is provided with a slot elongated in one direction, for example, vertically, while each said truss is provided at its top with plate means having a slot elongated in the opposite direction. The respective plate means mate or overlap in the transverse sense when the roof structure has been fully elevated, so that, with the respective slots in alignment with one another, the roof to side truss connection is quickly and easily completed by a crewman who has ascended the side truss purlins in the manner of a ladder to the truss top. As in other instances, the connection is made through the agency of a quick-release coupling pin; and a slight degree of side play permitted by the 90° related plate slots makes this an easy and quick operation. The lateral play also permits a degree of stress-avoiding "breathing" at the pinned joint.

Another improvement in accordance with the invention is in regard to the effecting of a weather-tight sealed connection of a cover to the shelter at the side and roof trusses of the latter; and this involves an improved way of seaming elongated panels of weather-proof fabric along and above or outward of the roof and side truss assemblies.

The foregoing, as well as other objects, will become more apparent as this description proceeds, especially when considered in connection with the accompanying drawings illustrating the invention, wherein:

Figure 1:
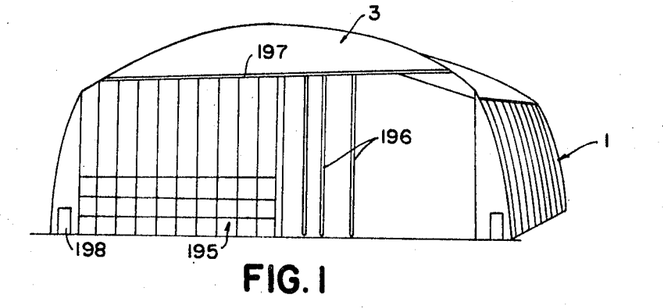
FIG. 1 is an end perspective view of the improved shelter, as fully erected in situ and with its protective fabric roof and wall components in place, the view omitting a part of an end door cover, as well as certain anchoring guy wires for the side truss structure of the shelter.
Figure 2:
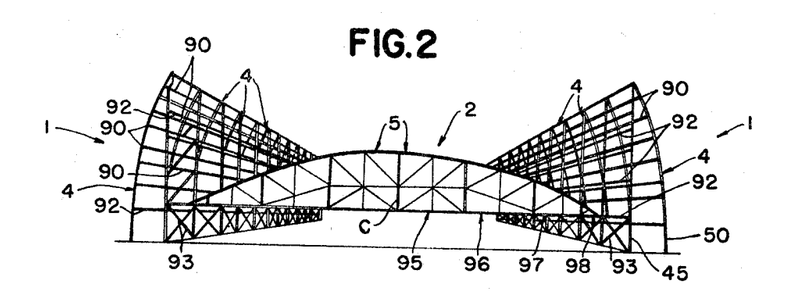
FIG. 2 is a perspective view of the uncovered shelter structure, with its side truss assemblies erected and anchored in position and with its roof truss assemblies in process of being lifted into position between the two series of side truss assemblies.

The improved hanger or shelter of the invention as illustrated in FIGS. 1 and 2, basically comprises two parallel and longitudinally extending, skeleton-like upright side truss structures, each generally designated 1, which are identical in nature but oppositely oriented position-wise; a skeleton-like roof structure 2 (FIG. 2) extending transversely of the side structures 1 and of a horizontal width approximately equal to the distance between the latter, and two lift truss structures (which do not appear in FIG. 2, but will be hereinafter described in detail), these lift structures extending along the end of roof 2 for raising the latter between the side truss structures 1. FIG. 1 shows a shelter as ultimately covered completely by a suitably weather-proofed fabric covering 3 composed of light-weight, plastic coated nylon panels. Of itself the cover 3 constitutes no part of the invention, save as it incorporates improved means for the joint seaming of its panels transversely along the side and roof trusses of structures 1, 2, respectively. The cover appears only in FIGS. 1 and 2 and, as to the seam provisions, in FIG. 39.

Figures 3, 4, 5, 6, 7, 8, 9, 10, 11:
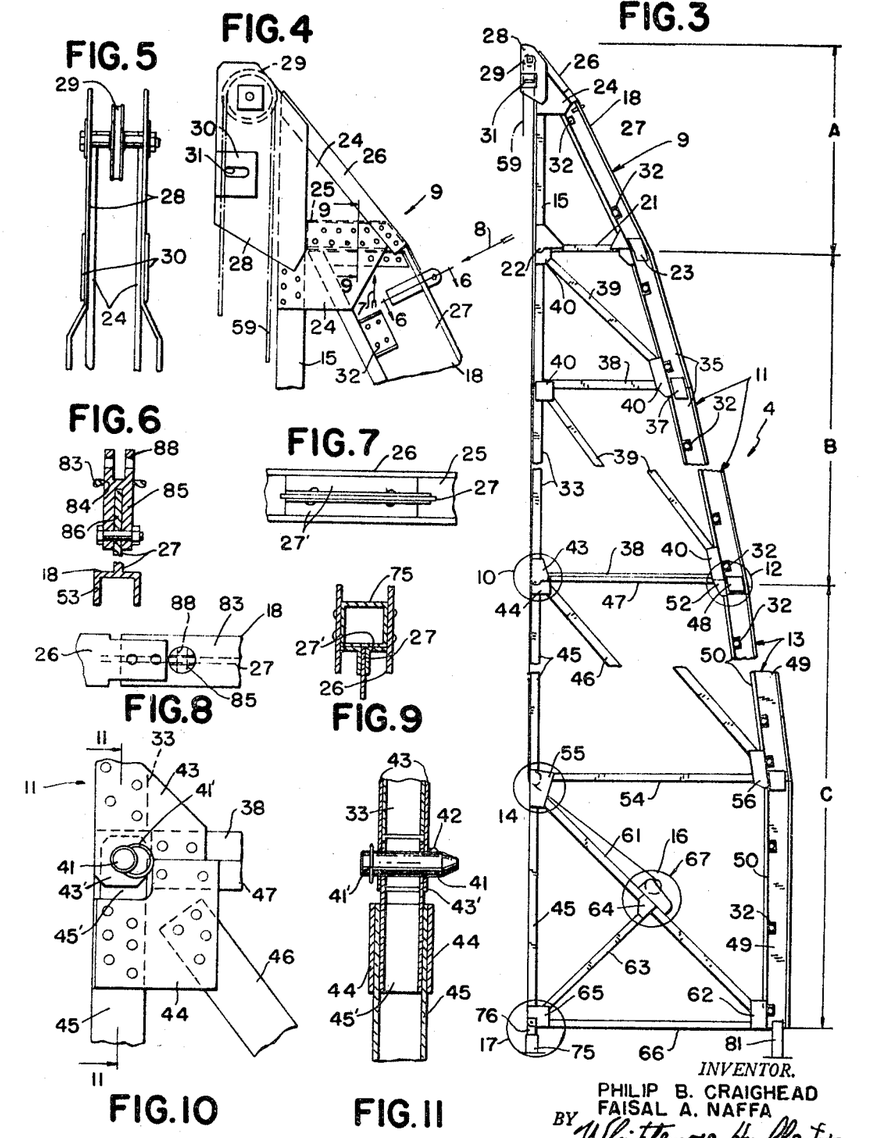
FIG. 3 is a side elevation, partially broken away, of a side truss, showing three component sub-assemblies units thereof, with numeral-designated circles indicating details which are the subjects matter of later, correspondingly designated drawing figures.
FIG. 4 is a fragmentary, enlarged scale side elevation of the upper extremity of the top unit of the side truss assembly of FIG. 3, showing a winch cable trained about a sprocket mounted by the unit.
FIG. 5 is a fragmentary view in end elevation from the left of FIG. 4, the cable being omitted for clarity.
FIG. 6 is a fragmentary view in section on line 6—6 of FIG. 4.
FIGS. 7 and 8 are, respectively, elevational detail views in the direction of the arrows 7 and 8 of FIG. 4.
FIG. 9 is a fragmentary view in vertical cross section on line 9—9 of FIG. 4.
FIG. 10 is an enlarged scale, side elevational view of a detail of releasable pin-type coupling, at the circle designated 10 on FIG. 3, of two of the component units or truss sub-assemblies of the full side truss of that figure, on the inner end of the truss.
FIG. 11 is a fragmentary view in section on line 11—11 of FIG. 10.

Each of the two side truss structures 1 is made up of a series of longitudinally spaced, upright trusses or truss assemblies 4 such as are illustrated in FIG. 3 (a full assembly view of a side truss) and FIGS. 4–17, inclusive, which show details of structural components and connections of the truss 4.

Figures 18, 19, 20, 21, 22, 23, 24, 25:
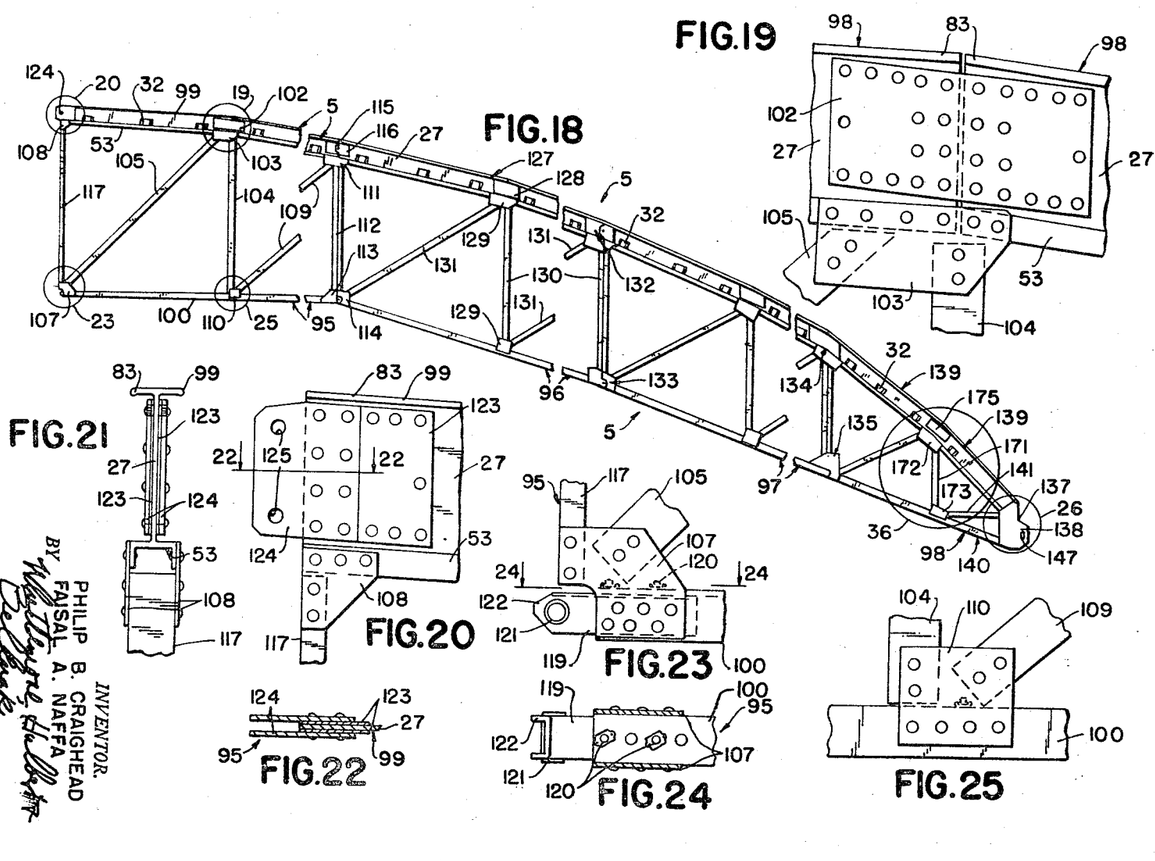
FIG. 18 is a side elevational view, partially broken away, of one of the similar halves of a two-part roof truss assembly employed in the construction of the improved shelter, certain details being here again circled and designated by figure numerals, as in the case of FIG. 3.
FIG. 19 is an enlargement of one such detail, i.e., a rigid connection of parts of a truss unit or subassembly to one another.
FIG. 20 depicts in enlarged scale a structural detail circled at 20 in FIG. 18, this involving a releasable pin type arrangement for coupling of the two halves of the roof truss to one another.
FIG. 21 is a fragmentary view in end elevation from the left of FIG. 20.
FIG. 22 is a fragmental view in horizontal section on line 22 of FIG. 20.
FIG. 23 is an enlargement of the detail circled at 23 in FIG. 18, i.e., for a pin type of coupling of the two roof truss assembly halves to one another.
FIG. 24 is a fragmentary horizontal section line 24—24 of FIG. 23.
FIG. 25 shows in enlarged scale the detail circled at 25 in FIG. 18, which is a riveted connection to one another of two component units of a roof truss half.
Figures 26, 27:
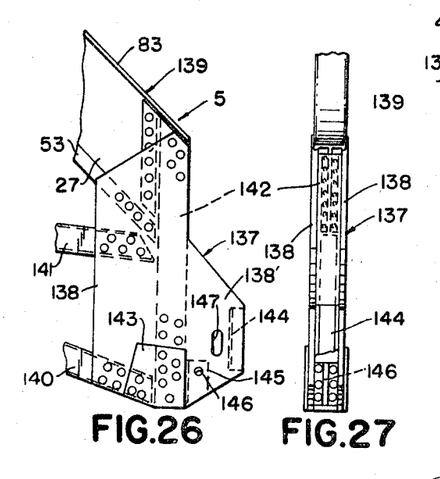
FIG. 26 is an enlargement of circled detail 26 of FIG. 18, i.e., at an end of a roof truss assembly at which the latter is ultimately coupled to a side truss assembly.
FIG. 27 is a fragmentary view in end elevation from the right of FIG. 26.

The roof truss structure 2 as a whole comprises a similarly longitudinally spaced series of almost identical, but oppositely oriented, roof truss assemblies, each generally designated 5. These are dealt with in FIGS. 18–27, of which FIG. 18 shows one complete assembly 5, and the two are individually assembled and then united to one another on the ground to constitute a complete roof entity 2.

Figures 29, 30, 31:
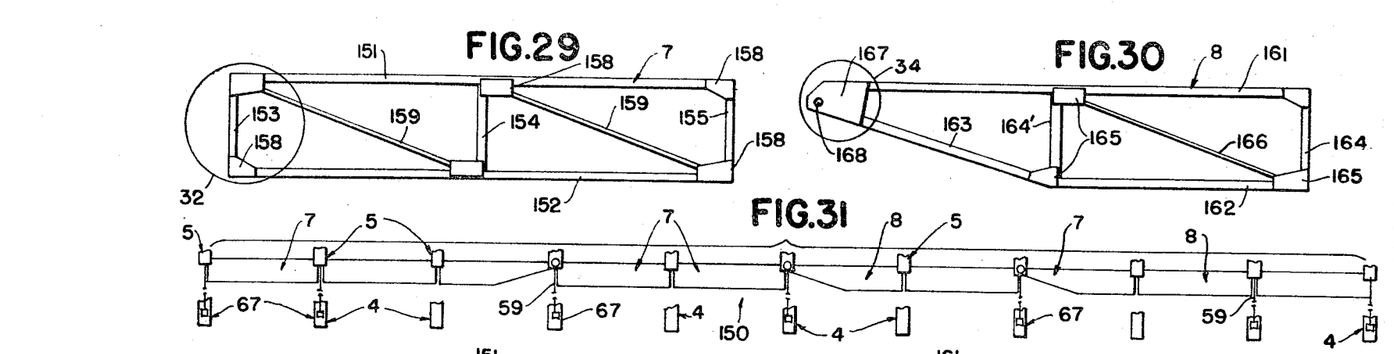
FIGS. 29 and 30 are views in side elevation of two different types of lift truss components or units which are employed in a longitudinal series in articulating the roof trusses for the raising and lowering of the latter in the manner shown in FIG. 28, these views having portions circled in reference to correspondingly designated details of figures to follow.
FIG. 31 is a very schematic elevational view of a typical combination in series of the lift truss components of FIGS. 29 and 30, the figure also indicating a special manner in which certain of those components are pivotally articulated to roof trusses, as well as connected by operating cable connections to winches mounted on the side trusses.
Figure 36:
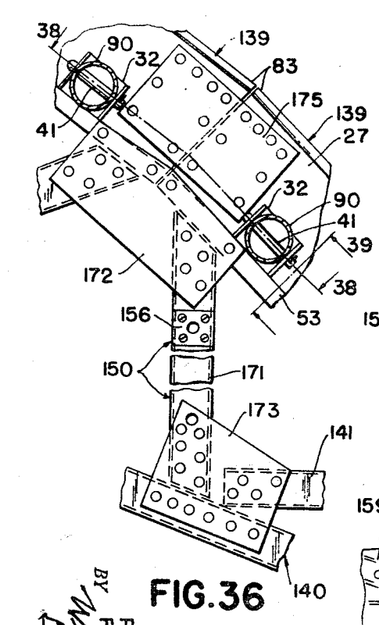
FIG. 36 illustrates in enlarged scale the circled portion 36 appearing in FIG. 18, this being at a zone in which the series of lift truss components are connected to the roof trusses in the fashion schematicaly shown in FIG. 31.
Figure 37:
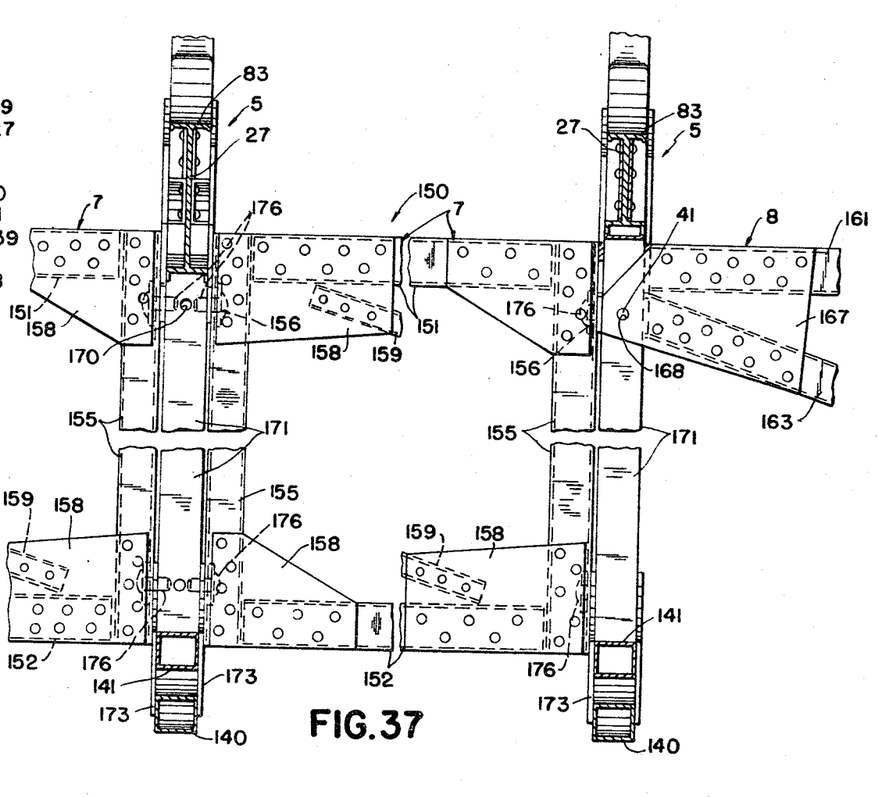
FIG. 37 is a fragmentary elevational view, partially broken away, from the right of FIG. 36.
Figure 38:
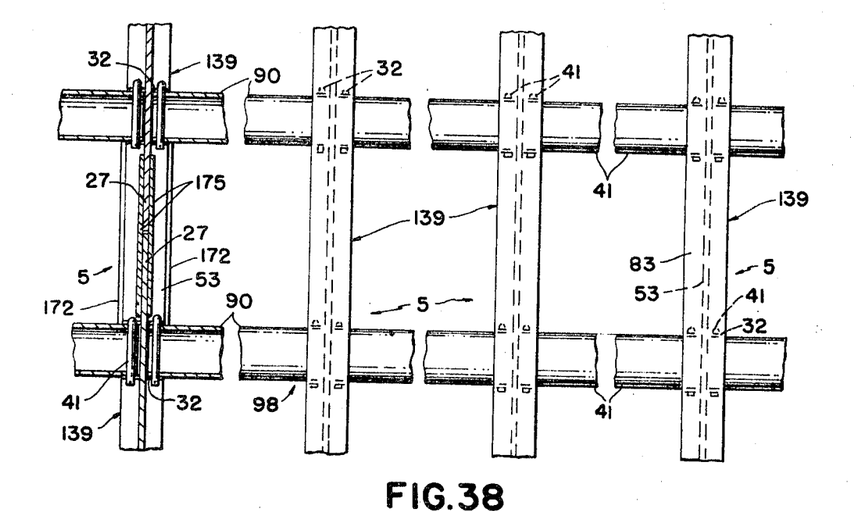
FIG. 38 is a fragmentary top plan view, partially broken away and in section on line 38—38 of FIG. 36, more clearly showing certain tubular purlin provisions which connect the roof (as well as the side) truss assemblies to one another in a longitudinally spaced, side-to-side series.

Each lift truss arrangement comprises a longitudinally extending series of lift truss components of the type generally designated 7 and 8 in FIGS. 29 and 30, respectively. FIGS. 32–35 show details of these units; while FIGS. 36 and 37 show the improved manner in which they are interconnected with the roof trusses to articulate the latter for lifting and lowering. The respective basic truss structures 4, 5, 7 and 8 will now be described in appropriate detail in the order just mentioned.

Side truss assembly

Referring to FIG. 3, a side truss or truss assembly 4 is shown therein as basically comprised of a top unit or sub-assembly 9 of height A, an intermediate unit or sub-assembly 11 of height B, and a bottom sub-assembly or unit 13 of height C. After end-to-end assembly of the units 9, 11 and 13 in horizontal position, followed by an erection by the crew to upright position, each side truss 4 is firmly anchored to the earth at the upright parts thereof and is guy wire-braced transversely in a manner to be described. For stability it is preferred that the first two of the assemblies 4 at an end of the side truss structure be coupled together by purlins, compression bar and tension rod provisions thereof, then erected and anchored as a unit, after which the remainder of the side trusses may be progressively erected along the line.

Considering the sub-assemblies or units 9, 11 and 13 in top-to-bottom order, the unit 9, as illustrated in FIG. 3 and as to its detail in FIGS. 4 through 9, is of triangular outline in end elevation. It comprises an inner vertical upright 15 of square tubular cross section, an outer, downwardly divergent upright member 18 of a generally I-beam shaped cross section (FIG. 6) and a horizontal base member 21 completing the triangle, it being, like upright 15, of square tubular cross section. All of these members are of aluminum or other light-weight metal, and this is also true of the components of the sub-assemblies 11 and 13, as well as the major components of the roof and lift truss assemblies.

At its left-hand lower end (FIG. 3), the top unit 9 is ground-assembled to the intermediate unit 11 by means including a releasable pin connection 22 (such as is later described in connection with the description of the intermediate unit 11, and illustrated specifically in FIGS. 10 and 11); and at its opposite side the unit 9 is connected to the top of unit 11 by means of an interleaved joint 23 of a type more fully described in connection with FIGS. 12 and 13, and such as will permit the ground assembly operation.

The truss unit or sub-assembly 9 is provided at the top thereof with a pair of spaced steel tie plates 24 (FIGS. 4 and 5) riveted to and connecting its upright members 15 and 18, these plates being of triangular shape and disposed at the apex of the triangular truss unit. As appears in FIGS. 4 and 9, a short tubular spacer section 25 is employed between plates 24 in effecting the connection to the inclined, I-section upright 18, along with an inclined adaptive channel 26. The legs of the latter straddle the sides of spacer 25 and tie plates 24; and the web 27 of upright 18 has angles 27' riveted thereto, which abut upwardly against and are riveted to the bottom of spacer 25 for desired stability and stiffness, as shown in FIGS. 7 and 9.

Figure 28:
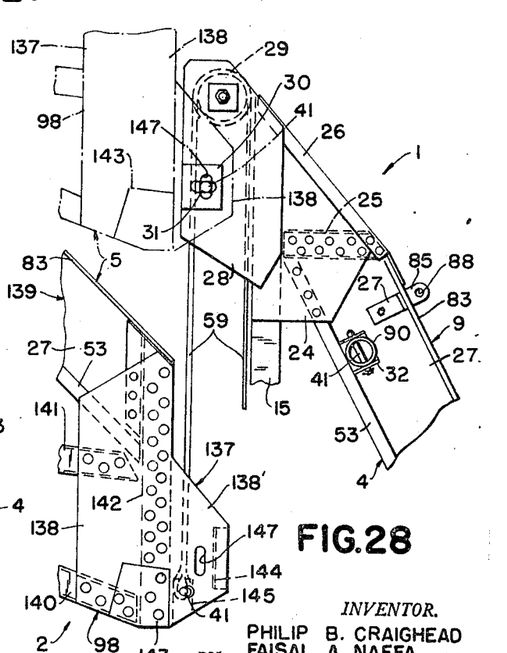
FIG. 28 is a fragmentary side elevational view showing in solid and dotted line the relationships of a side truss and a roof truss assembly to one another as the latter is being elevated to or lowered from position in which it is pin-connected and locked to the top of a side truss assembly.

A pair of steel pulley-journaling plates 28 are riveted to the outer sides to tie plates 24, the respective plate sets 24 and 28 being apertured in alignment to rotatively journal a winch cable pulley 29 therebetween, as appears in FIG. 5. Downwardly of pulley 29 the steel plates 28 have welded or otherwise fixedly secured thereto a pair of small side plates or pads 30 of tough and wear resistant metal, such as hardened steel. These pads 30, as well as the plates 24 and 28 inwardly thereof, are each provided with a horizontally elongated slot 31 for the purpose of receiving a pin for the quick connection of a roof truss to a side truss in a manner which is shown in FIG. 28 of the drawings.

Finally, the outer upright 18 of top side unit 9 has longitudinally spaced, U-shaped clips 32 riveted thereto to act as seats receiving the truss-connecting purlins of the side structure 1, in a manner to be described. Similar spaced seat clips are also carried by the outer uprights of side truss sub-assemblies 11 and 13, also by the outer I-beam members of the roof truss structure 2.

The intermediate unit or sub-assembly 11 of each side truss 4 is, as illustrated in FIG. 3 (to be considered with FIGS. 10, 11, 12 and 13) of truncated triangular outline and comprises an inner vertical upright 33 of aluminum in a square tubular cross section; an outer inclined upright which may, in order to provide a non-rectilinear outline thereto, be constituted by a pair of aluminum I-beam lengths 35 rigidly joined end-to-end at the webs thereof by riveted tie plates 37; a pair of parallel, upper and lower tubular crosspieces 38 rigidly connected across uprights 33 and 35 in the riveted pre-fabrication thereof, the lowermost constituting the base of intermediate sub-assembly 11; and tubular inclined aluminum struts 39, which are rivet connected at their opposite ends to the uprights 33 and 35 by the use of corner connector or tie plates 40.

Figure 13:
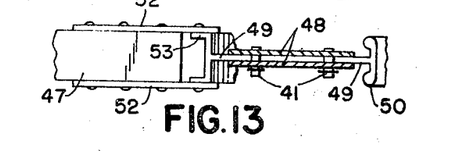
FIG. 13 is a fragmentary view in horizontal section on line 13—13 of FIG. 12.

Now referring to FIGS. 10 and 13 in conjunction with FIG. 3, quick release, field connections of the intermediate truss unit 11 to the bottom truss unit 13 are representative of corresponding releasable connections of unit 11 to top unit 9 at 22 and 23, as mentioned above. That is, at the inner upright 33 (or 15) the connection is effected through the agency of a quick-release pin 41 equipped with a pull ring 41', and also with a spring-urged ball detent 42 (FIG. 11) to prevent accidental displacement of the pin. Adjacent the lower left-hand side of the intermediate unit 11, as viewed in FIGS. 3 and 10, a pair of steel tie plates 43 are riveted to opposite sides of the tubular upright 33 and the lower tubular crosspiece 38, thus rigidly connecting these parts.

Likewise, steel tie plates 44 are riveted to the opposite sides of a vertical tubular upright 45, an inclined brace strut 46 and a top crosspiece 47 of the bottom truss unit 13. The pin 41 extends through aligned openings at the top of uprights 45 and in short integral ear or tongue extensions 43' of the tie plates 43, thus enabling a quick, strong and releasable field connection of the units 11 and 13 to one another.

If desired, the inner upright 45 of bottom unit 13 may be of greater cross section than that of the intermediate upright 33, in order to give greater rigidity because of extra stresses it sustains. In this event, as shown in FIG. 11, an adapter section 45' is telescoped into the top of upright 45 and riveted to the latter and to tie plates 44.

The inclined outer uprights 35 of intermediate truss unit 11 connect downwardly to those of bottom unit 13 in a different, but still releasable, fashion by means of an arrangement of pin connected steel plates which is shown in FIGS. 12 and 13, again considered in conjunction with FIG. 3; and a corresponding connecting arrangement is employed at 23 between the intermediate and top units 9 and 11.

Figure 12:
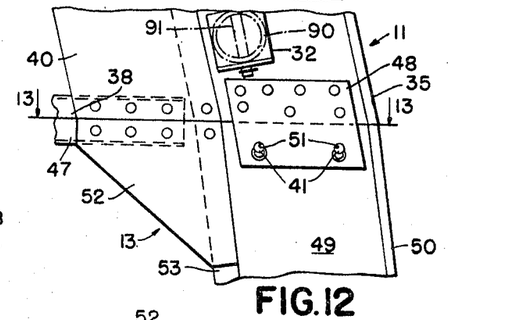
FIG. 12 is an enlarged scale side elevational detail circled at 12 in FIG. 3, this view depicting a releasable tie plate and pin connection, in a somewhat different way, of the components of FIG. 10 at the outer end thereof.

Thus, a pair of steel side plates 48 are riveted to the bottom of the web of the I-beam member 35 of unit 11 and project a substantial distance beneath that end, as shown in FIG. 12. Plates 48 are spaced apart the thickness of the web 49 of the uppermost of two rivet-joined uprights 50 of bottom unit 13; and these projecting portions of the plates 48 are provided with pairs of aligned, transversely spaced holes 51. The web 49 has correspondingly spaced openings which come into alignment with holes 51 when the plates 48 are slid from above over the web 49 of upright 15. Quick release pins 41, similar to those of FIGS. 10 and 11, are inserted in the aligned plate and web openings, thereby completing the field connection of units 11 and 13 to one another.

As shown in FIGS. 12 and 13, the right hand end of the top cross piece 47 of the bottom truss unit 13 is rivet-connected between steel tie plates 52, which in turn straddle an inner furcated flange 53 of upright 50 and are rivet-connected to that flange. As indicated above, the releasable unions at 22 and 23 of the top unit 9 and the intermediate unit 11 to one another are substantially identical to the connections illustrated respectively in FIGS. 10 and 11 and in FIGS. 12 and 13.

Figures 14, 15:
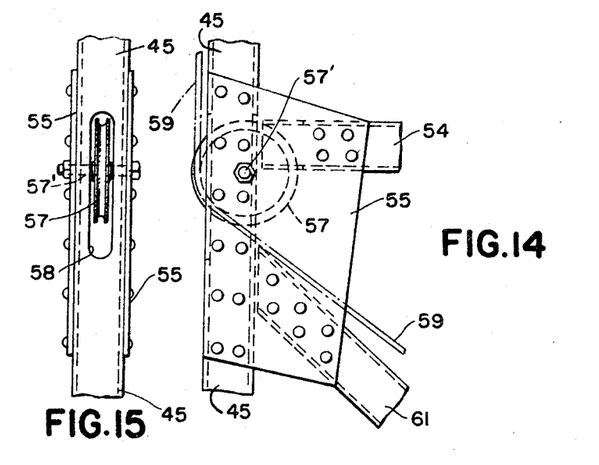
FIG. 14 represents an enlargement of the detail circled at 14 in FIG. 3, at which a winch cable is sprocket guided upwardly of the side truss.
FIG. 15 is a fragmentary end elevation from the left of FIG. 14, the cable being omitted in the interest of clarity.
Figure 16:
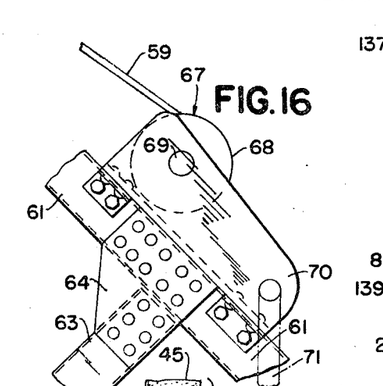
FIG. 16 is a fragmentary and very schematic, enlarged scale showing of a lifting winch associated with a side truss assembly in the manner circled and correspondingly designated in FIG. 3.
Figure 17:
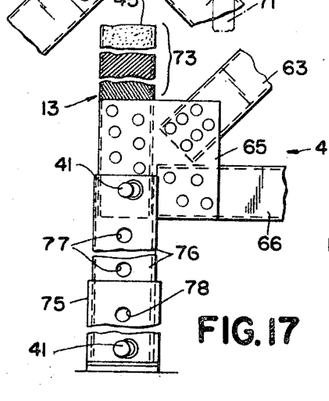
FIG. 17 depicts in enlarged scale the details circled at 17 in FIG. 3, including a quick assemble and release type of pin coupling of a side truss to a ground support at an inner end of the truss, also showing a color coding feature of an upright of the truss.

Reference should now be made to FIGS. 14, 15 and 16, in conjunction with FIG. 3, for details of certain winch mounting and winch cable guiding means for the elevation and lowering of the roof structure 2. Thus, the truss unit 13 includes an intermediate horizontally extending cross brace or strut 54 of tubular section which has a riveted connection at its opposite ends between pairs of steel tie plates 55 and 56, the latter of which also anchor the lower end of the inclined strut 46. Plates 55 and 56 are appropriately secured rigidly to the respective bottom unit truss uprights 45 and 50, as well as to cross strut 54, as by riveting (FIG. 14).

The pair of left hand plates 55 rotatably journal a cable guide or idler pulley 57, as on a suitable pivot pin 57' extending through those plates and the tubular upright 45; and the latter is provided with a vertically elongated slot 58 on its inner wall, through which a winch cable 59 passes, being then trained upwardly and about the pulley 29 of top side truss unit 9, as illustrated in FIGS. 3, 4 and 5. Cable 59 connects downwardly to the roof truss assembly 5, as will be described.

A diagonal bracing strut 61 is anchored at its upper end by a riveted connection between the pulley-journaling tie plates 55, and is similarly riveted at its lower end between steel plates 62 rigidly mounted to the lower and outer side of bottom truss unit 13 (FIG. 3). This strut is itself further braced medially by a 90° inclined strut 63, as between riveted plates 64 at the upper end of the latter and other tie plates 65 at its lower end, to which further reference will be made. Side truss sub-assembly 13 is completed by a bottom cross brace 66 riveted at its ends between the respective pairs of tie plates 62, 65.

Now referring to FIG. 16, in conjunction with FIG. 3, it very schematically shows a simple hand operated winch device 67, including a drum 68 about which the cable 59 is wound, the drum 68 being schematically shown as journaled by a shaft 69 between a pair of side plates 70, which are rigidly bolted to the upper surface of strut 61 at the approximate mid-point of the latter. Actually, the winch 67 is a ratchet type having a power multiplying gearing from its hand-crank 71, indicated schematically in dot-dash line in FIG. 16, to the drum 68. Inasmuch as structural details of winch 67 form no part of the present invention, further illustration and description thereof are dispensed with. By reason of improvements in the lift truss arrangements (hereinafter described), it is possible for a crew of but 14 men, hand-operating seven winches 67 on each side, to readily elevate a complete roof structure 2 between side truss structures 1 of a shelter having 11 side truss assemblies 4 along each of its sides, the roof 2 having similar number of individual roof assemblies.

A feature of improvement afforded by the invention resides in the provision of means which enable the crew, or a crew supervisor, to visually check the progress of hoisting the roof structure. Thus, the inner side truss uprights 15, 33 and 45, or some portion thereof, are painted at successive vertical zones in different contrasting colors, as illustrated by the hatching at 73 in FIG. 17. Thus, the supervisor and/or his crew may keep an eye upon the rising or lowering position of an end of a roof truss assembly, by reference to the upwardly staged color coding 73 at the side truss assemblies 4. Should the trusses 5 not be in substantial horizontal register at all side truss stations, in being hoisted or lowered, appropriate compensating action may be taken at one or more of the winches 67 to correct the non-uniformity.

Again referring to FIG. 17 in conjunction with FIG. 3, the inner upright of each side truss is basically sustained by a strongly ground-anchored base plate socket 75, within which an upright tubular adapter 76 of rectangular section telescopes. The adapter 76 has a vertically spaced series of holes 77 through opposed side walls thereof; and the base socket 75 is similarly provided with a series of holes 78, with a quick release pin 41 being engageable in aligned adapter and socket holes to effect a desired adjustment of the height of the adapter above the ground.

The tie plates 65 at the bottom inner corner of side truss assembly also carry a pair of through-holes (also extending through inner upright 45), and a further quick apply and release pin 41 is engaged through the adapter holes and plate holes to effect a quick field coupling of each side truss 4, after completion of ground assembly of the latter to the earth-anchored base plate socket 75 for that truss. This enables a ready adjustment of the side trusses into accurately coordinated upright position. In this manipulation, the outer side upright 50 of bottom truss unit 13 may be supported at 81 (FIG. 3) by an upright, ground-anchored member.

Reference has been made to the fact that the side truss assemblies 4, in addition to their base plate anchorages, are braced from the outside by ground anchored guy wires (not shown). In this connection, attention is invited to FIGS. 4, 6 and 8 of the drawings.

For the purpose of attaching the guy wire to the side truss, adjacent the upper end of the latter, an outer flange 83 of the inclined upright 18 of top side truss unit 9 is apertured at 84 to receive a cylindrical, stem-like clevis member 85, which clevis is slotted at 86 to straddle the web 27 of the upright 18. The outer forked end of member 85 is provided with aligned holes 88, which are adapted to receive a quick-release pin (not shown), whereby a guy wire may be secured, as by a suitable loop at its end, to the pin. Accordingly, each side truss 4 is individually braced very strongly against wind-deflection, in supplementation of its braced ground connection, and also by the stabilizing bracing which is contributed by the roof truss structure which it supports.

FIG. 12 of the drawings, considered in conjunction with FIG. 3, indicates the manner in which rigid and elongated, tubular purlin tubes 90, of aluminum or other light-weight metal in a cylindrical cross-section, are applied to the purlin seats 32 in uniting successive side trusses 4 in parallel, longitudinally spaced relation to one another, each pair being spaced by a rectangular bay. See also FIGS. 2, 28, 36, 38 and 39, of which the latter three figures illustrate the application of purlins 90 to and between successive roof truss assemblies 5. However, the purlin arrangements at the side trusses 4 are identical to those at the roof trusses.

Thus, with two ground-assembled side trusses in parallel upright relation to one another, the ends of the purlins 90 are disposed in the purlin seats 32 fixedly secured to the webs 27 of the outer uprights 18 of the trusses, whereupon quick apply and release locking pins 41 are thrust through aligned opening in the seats 32 and openings of the same size adjacent the end of the purlins.

Incidentally, while the pins 41, as used at various interconnections may differ in diameter and length, they are uniformly designated 41 herein for simplicity. It has been found desirable to thus interconnect the two end-most truss assemblies 4 while the latter are still on the ground, thus permitting a more stably performed operation by the crew in lifting the light-weight structure into upright position. Succeeding trusses are erected individually and purlined to the preceding.

Furthermore, the successive side truss assemblies 4 are additionally braced by means of elongated tubular compression members or bars 92 and inclined, solid section tension rods 93, as shown very schematically only in FIG. 2. Thus, as additionally braced transversely by guy wires (not shown) attached to the clevis members 85 of each side truss 4 and anchored at quite a distance outwardly of the latter, the complete side truss structure 1 is a very stable one indeed. This is not to mention the further considerable rigidifying action when the structures 1 have coupled thereto the trusses or truss assemblies 5 of the roof structure 2, now to be described.

Roof truss assembly

In view of the preceding detailed illustration and description of the side truss construction, it is believed that the description of the roof trusses 5 needed not be very detailed, inasmuch as basic structural concepts embodied therein are very similar indeed, to those of the side construction.

Reference being had to FIGS. 18, showing the entirety of one of two substantially identical, but oppositely oriented, roof truss assemblies 5, each is composed of four factory pre-fabricated sub-assemblies or units, generally designated 95, 96, 97 and 98, respectively, in their progression from inside to outside or, left to right, as viewed in FIG. 18.

As appears in FIG. 19, a detail circled in FIG. 18, the inner unit 95, which faces a similar unit at the opposite side of the roof structure center line C (FIG. 2), is composed of two end-to-end arranged and rivet-connected, top truss lengths 99 of I-beam cross section, and a single bottom length 100 of square tubular section, both being of aluminum or other light-weight metal, as previously indicated. Since the shape of the upper truss members 99 is the same as that of the outer side truss uprights 18, their web and flange features are designated by corresponding reference numerals, and this is true also of the I-members of the other three truss units 96, 97 and 98. Bottom truss member 100 is of the same square cross section as the side truss uprights 15, 33 and 45.

As illustrated in FIG. 19, the beam members 99 are rigidly riveted together between steel tie plates 102 at the webs 27 thereof; and further steel tie plates 103 function in the riveted connection of truss members 99 at the inner flange 53 thereof. Upright and inclined struts 104, 105, respectively, are also riveted at their upper ends between plates 103. The left hand end of bottom truss member 100 and the lower end of inclined strut 105 are received and riveted between further steel coupling plates 107 of a special nature (to be described); and the flange 53 of top truss member 99 fits between tie plates 108 at the left (FIG. 18), adjacent special releasable upper union means for the two roof trusses 5, presently to be described.

Unit 95 also has a tubular inclined strut 109, which is riveted, along with upright member 104, at its lower end between steel tie plates 110 (FIG. 25) on horizontal truss member 100; while the opposite, upper end of strut 109 is rivet-connected between connector and tie plates 111, along with an end upright 112 of unit 95. The lower end of member 112 and the right hand end of truss member 100 are similarly riveted between connector and tie plates 113; and the roof truss unit 95 is releasably articulated by these plates 113 at its bottom to connector and tie plates 114 of the next adjacent truss unit 96.

It is releasably joined at its top to unit 96 by connections 115, 116; and the bottom and top connections at 113, 114 and at 115, 116 are substantially identical to the respective releasable pin connections of the side truss sub-assemblies of units 11 and 13 to one another. These are shown in FIGS. 10 and 11 and FIGS. 12 and 13, respectively, and accordingly they are not further described or illustrated.

Reference now being had to FIGS. 23 and 24, in conjunction with FIG. 18, the special coupling and tie plates 107 are employed for the reception and rivet-connection of the lower-most end of a tubular end upright 117 of unit 95, which is similarly connected at its upper end between the riveted tie plates 108. The bottom truss member 100 is received between plates 107, and a steel adapter 119 of inverted channel-shaped cross section is telescoped within the outer end of tubular strut 100, as shown in FIGS. 23 and 24.

This adapter is strongly secured in this position by upright bolts 120, as well as riveting through the plates 107. It projects outwardly of the end of truss member 100 and is provided at its depending flanges with aligned openings which are bushed at 121. These openings are adapted to receive a releasable tie pin 41 which will also extend through a mating or telescoped connecting member (not shown) on the opposed roof truss sub-assembly (corresponding to unit 95) of the other, oppositely oriented roof truss assembly 5. Adapter 119 is formed at its nose 122 to register and mate with a socket formation on the opposite sub-unit 95. It is in the sole respect to their specific coupling means at 107 and 108 that the two roof truss halves differ a bit from one another.

Now referring to FIGS. 20, 21 and 22, the structure for a releasable coupling of those halves adjacent the upper connector and tie plates 108 is shown therein. For this purpose, a pair of further steel plates 123 of considerable and substantially rectangular area are riveted to opposite sides of the web 27 of the innermost upper truss member 99. In addition, further steel plates 124 are riveted to the sides of the plates 123 and through web 27, projecting outwardly of the end of member 99. Plates 124 are provided with pairs of vertically spaced and aligned pin-receiving holes 125; and the transverse spacing of the plates 124 is such that they may snugly receive therebetween a coacting tongue-like connector plate (not shown) of the end unit 95 of the other roof assembly 5. Quick release tie pins 41 are again employed for this purpose.

The second roof truss sub-unit 96 is composed of upper I-beam components 127 end-united to one another by riveted tie plates 128, similar to plates 102 and in the manner shown in FIG. 19; and top and bottom tie plates 129 rigidly connect upright and inclined members or struts 130, 131 of unit 96 in the manner illustrated in FIGS. 19 and 25.

The unit 96 is releasably connected to the next outwardly adjacent unit 97 of the roof truss assembly 5 in practically identically the same manner as is shown in FIGS. 10 and 11, at upper and lower releasable coupling plate unions, generally designated 132, 133; and the same is true of the releasable connections of sub-assembly or unit 97 to the outer end unit 98, as at the plate unions 134, 135, respectively.

The end-most unit 98 of truss 5 is provided at its extremity with a special plate device, generally designated 137, for the reinforcement and quick coupling of that end of the roof assembly to the top of an adjacent side truss assembly 4. Details of this connection appear in FIG. 26 and 27, with the action in raising and lowering the roof truss structure being depicted in FIG. 28.

For this purpose, a pair of steel connector plates 138 of relatively thick gauge are strongly riveted, in parallel relation to one another, to the ends of the adjacent one of two end-connected I-beam upper truss members 139 of unit 98. Such connection is made at the flange 53 of the latter, as well as to the end of an adjacent lower tubular truss member 140 of the unit 98, and to an end of a horizontal tubular stiffening strut 141 of the latter. The opposite end of strut 141 is riveted between other tie plates, to be described. An upright tubular length 142 of stock is employed to assist in association with these connections, being riveted between plates 138 and thereby further serving to strongly connect members 139, 140 and 141 to one another.

The union of parts may be still further rigidified at this stress-receiving terminal of roof truss 5, as by means of external riveted plates 143; and a steel spacer 144 of channel section may also be riveted between plates 138, at tongue portions 138 thereof which project outwardly beyond tubular member 142. Finally, a T-shaped bracket 145 is riveted to the face of tubular upright 142, which bracket is provided on the web thereof with a hole 146 for the reception of a quick apply and release-type cable anchoring pin, as hereinafter described in connection with FIG. 28.

Plates 138 are provided, just inwardly of the spacer 144, with aligned vertical slots 147 which are adapted, when located in general register with the horizontal slots 31 of the top, pulley-journaling plates 28 of side truss assembly 4, to receive a quick release coupling pin 41, as indicated in dot-dash line in FIG. 28. This ties the side and roof truss assemblies 4, 5 to one another operatively, but with some degree of lost motion which will enable the alignment or registry of the slot openings 31 and 147 to be quickly and conveniently accomplished by a crew man, having ascended the side truss structure 1 at its connecting purlins 90.

The relationship of the roof structure 2 to the side truss structure 1 in the operation of elevating the former (or lowering it) is shown in FIG. 28. The roof truss assembles 5 are simultaneously brought upwardly by a crew operating the fourteen winches 67, with a loop at the lower end of each winch cable 59 being engaged by a quick release pin 41 inserted in the hole 146 (FIG. 26) of the bracket 145 between roof truss coupling plates 138. The progress of the raising of roof structure 2 is noted by the crew men, or their supervisor, by visual reference to the progressive color-coding 73 (FIG. 17) on the side truss uprights 45; and individual corrections of timing of operations at the respective winches 67 may be made from time to time, so that the roof is not subjected to objectionable local stressing. The possibility of such stressing is, of course, much reduced, if not practically eliminated, by reason of the improved lift truss provisions now to be described.

Lift truss structure

Reference should be had to FIGS. 29, 30 and 33–35 for mechanical features of this structure, as composed of the constituent pre-fabricated units 7 and 8; and additional reference may be had to FIGS. 31, 36 and 37 in regard to its physical relationship and connections, as an assembled combination generally designated 150, to the several roof trusses 5 of roof 2.

Figures 32, 35:
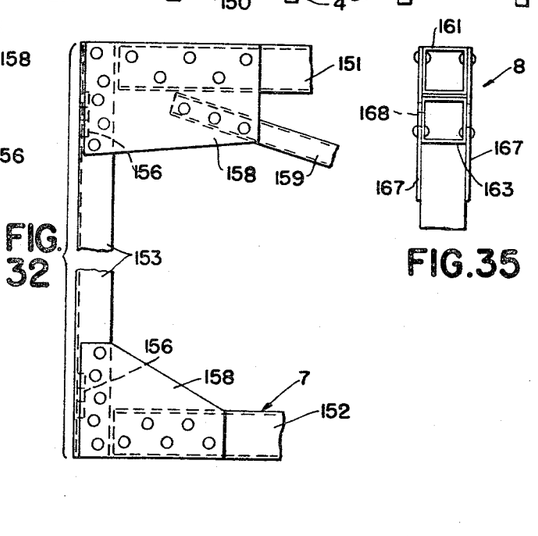
FIG. 32 represents an enlargement of the detail of a rigid lift truss unit which is circled at 32 in FIG. 29.
FIG. 35 is a fragmentary enlargement in end elevation from the left of FIG. 34.
Figure 33:
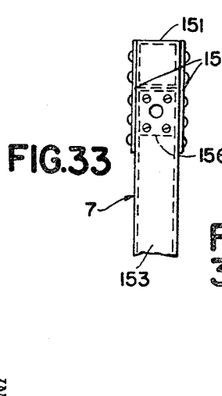
FIG. 33 is a fragmentary end elevational view from the left of FIG. 32.

Lift truss units 7 and 8 are individually rigid. As shown in FIGS. 29, 32 and 33, unit 7 is of elongated rectangular outline, comprising horizontal upper and lower lengths 151, 152 of aluminum or other light-weight tubular stock in a square cross section, and end and intermediate upright lengths 153, 154, 155 of similar stock. However, for the purpose of making rigid connections to other life truss units or components, the end uprights 153, 155 are preferably of channel-shaped cross section; and (FIGS. 32 and 33) they have apertured steel pads 156 bolted or riveted thereto within the flanges thereof for a purpose to be described. Pairs of steel tie plates 158 are employed to effect riveted connections of the uprights 153, 154, 155 to the horizontal members 151, 152; and certain of these plates also serve to anchor therebetween the ends of inclined internal struts 159.

Figure 34:
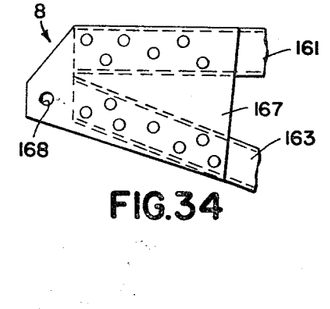
FIG. 34 shows in enlarged form the circled detail 34 of FIG. 30.

As shown in FIGS. 30, 34 and 35, the second type of lift truss unit or component 8 is of an irregular outline. It includes an elongated tubular, horizontal upper aluminum member 161 of square cross-section, an approximately 50% shorter, lower aluminum members 162 of like stock, a further similar but inclined member 163 extending convergently from member 162 toward the end of upper member 161, and end and intermediate uprights 164, 164', respectively, extending between member 161 and 162. End member 164 is equipped with steel coupling pads similar to the pads 156, for a similar purpose. Members 161, 162, 164 and 164' are united in a rigid, unitary construction by riveted tie plates 165, certain of which also secure an inclined internal strut 166.

As shown in FIGS. 34 and 35, the converging ends of the members 161, 163 of lift truss unit 8 are rigidly united by steel tie and coupling plates 167 at their extremities. These plates are riveted to the outer sides of members 161, 163, projecting somewhat beyond the ends thereof, and are provided with aligned openings 168 (FIG. 34) for the reception of a quick release coupling pin 41. Through this agency the lift trus unit 8 may be pivotally articulated to an adjacent roof truss assembly 5 at its end plates 167 straddling a part of the latter, and hence in effect articulating it to the next adjacent unit 7, in a manner to be described.

FIG. 37 illustrates the manner in which the units 7, 8 of lift truss structure 150 are connected to roof truss assemblies. A quick release pin 41 is inserted through the aligned openings 168 of the connector plates 167 of a unit 8 (right hand), which has been anchored at its right to another unit, and through transverse openings 170 which are provided in a tubular upright strut 171 of the roof truss to receive the pin. This strut, as shown in FIGS. 18 and 36, is riveted at its top and bottom between tie plates 172, 173 on the upper and lower roof truss members 139 and 140, Further riveted tie plates 175 connect the two upper members 139 of truss unit 98 at the respective webs 27 thereof (see FIGS. 36 and 38).

Again referring to FIG. 37, a next adjacent rectangular lift truss unit 7 is secured, by bolts 176 applied to its pads 156, to the roof assembly to which unit 8 pivots; and the opposite end of life unit 7 is similarly connected rigidly by bolts 176 to another adjacent roof truss or truss assembly 5. There may be still another succeeding unit 7, similarly connected rigidly to the opposite side of assembly 5.

FIG. 31 schematically, and even diagramatically, illustrates the succession of components or units 7, 8 of the lift truss structure as operatively applied to roof trusses 5, in the zones of transverse alignment of the latter with side trusses 4, and with winches 67 carried by certain of the side trusses. Thus, proceeding from the left, two rectangular truss units 7 are rigidly connected to the end-most and the next two succeeding roof trusses. A pivoting truss unit 8 is rigidly connected to the third truss assembly 5, and is pivotally connected to the fourth, at which a winch 67 and its cable 59 operate. The fourth and fifth lift truss components are rigidly connected units 7; the sixth is a pivotally connected one, rigidly connected to the seventh. There next succeed a pivotally connected component 8, which is in turn rigidly joined to the last two, rigidly connected lift truss units 7. Rigid connections are made at the bolt pads 156; and pivotal connections are made at the mating life and roof truss holes 168 and 170, respectively. The result is that, despite some possible unevenness in the rate of winch cranking by the crew members, the lift truss arrangement 150 as a whole may flex to a degree at the zones of pivotal articulation. Accordingly, the imposition of possibly damaging or destructive stresses on the roof of lift truss assemblies is eliminated.

Cover seaming

Figure 39:
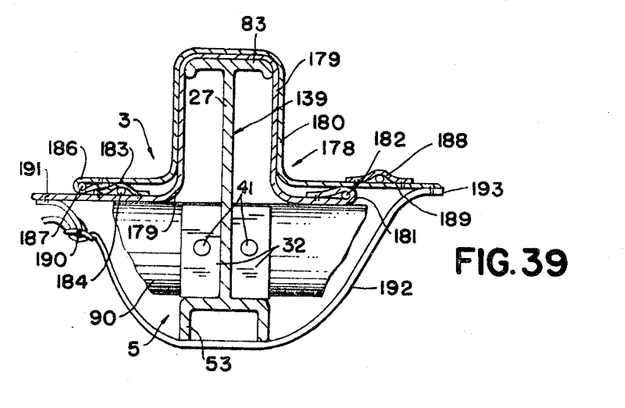
FIG. 39 is an enlarged scale view in section on line 39—39 of FIG. 36, showing an improved arrangement for seaming waterproof cover panels of the shelter across the zones of the roof and side trusses.

The cover of fabric shield 3 of the center which appears in FIG. 1 is illustrated in FIG. 39 in specific reference only to the improved seaming at 178 of adjacent panels 179, 180 thereof. These panels, preferably of a light-weight, plastic coated nylon or like fabric material, are individually of a width somewhat exceeding the spacing of the longitudinal series of connected roof and side truss assemblies 4, 5 from one another; and they are of a length, cross-wise of the shelter, approximating the respective lengths in that direction of the trusses 4, 5 to which they are individually applied.

In accordance with the seaming improvement 178, the first cover panel 179 is provided at its right hand extremity (FIG. 39) with a stitched loop 181 coextensive in length therewith, which loop internally receives an elongated draw rope or cord 182, thereby enabling the panel 79, as brought over the top of the roof I-beams, to be drawn tight over the tops of the several purlins 90 which interconnect the truss assemblies of roof 2. Another stitched loop 183 is provided on the first cover panel 180 in a zone paralleling loop 181 and on the opposite side of beam 139 from the latter; and loop 183 receives another elongated cord 184 for the same purpose as the cord 182.

Similarly, the second cover panel 180 is provided with a stitched end loop 186 receiving a cord 187, so that the panel 180 can be drawn tightly into place over the purlins 190, overlapping the loop 183 and cord 184 of first panel 179. Likewise, a second loop 188 is stitched to panel 180 on the opposite of I-beam 139, receiving a draw cord 189 to enable panel 180 to be brought snugly in place in overlapping relation to the free end of panel 179 and at its loop 180.

The seaming unit 180 is further held in place by a series of buckle and strap devices 190, each stitched at 191 to one of the panels 179, and a coacting elongated strap 192 stitched at 193 to the other panel 180. When drawn up tightly, these components effect a very snug, displacement-resisting connection of the roof cover 3 to the roof and side truss assemblies.

Miscellaneous

It is usually desirable to incorporate front and rear end wall covers in the shelter cover 3, as indicated by the reference numeral 195. These are connected to light-weight uprights 196 which in turn are mounted for lateral sliding movement, in a mannenr of traverse rod-hung members, along a horizontal end frame member 197. However, such details are not particularly significant to the present invention. Likewise, the front and end wall structures may be equipped with auxiliary service doors 198, as shown in FIG. 1.

The invention makes possible the quick and easy erection in situ of a field hangar or shelter which has surprising strength and rigidity. Its components are mainly of very light-weight metal capable of being readily handled as pre-fabricated sub-assemblies and, following ground assembly, to be erected by manual means in the manner described above.

Quick apply and release pin interconnections contribute greatly to the ease and speed of the erecting operation, as well as to the dismantling when desired; and improvements in relation to the color coding of the side truss assemblies, as well as the composition of the lift truss assembly 150 to include pivotally articulated parts, has been found to be a great boon in the raising and lowering of roof thruss structure 2.

What we claim is:

1. A shelter structure of the type described, comprising a longitudinally spaced series of upright side truss assemblies having means to anchor the same to the ground in parallelism with one another, a longitudinally spaced series of roof truss assemblies in transverse alignment with the respective side truss assemblies, said roof truss assemblies having lift truss units articulating the same adjacent an outer end thereof in parallelism with one another for the co-ordinated raising or lowering of the roof truss assemblies relative to the side truss assemblies, said side and roof truss assemblies being provided with means adjacent the top of the former to effect a quick release coupling thereof to one another when said roof truss assemblies have been fully raised by operation of said lift devices, said coupling including means permitting a substantial degree of movement of the side and roof assemblies relative to one another in making and releasing the coupling, said quick release coupling comprising a coupling pin, said side and roof truss assemblies being respectively provided with elongated slots at 90° to one another for the releasable reception of the pin when said slots are brought into alignment with one another consequent to said relative movement, said lift truss units having hinge means pivotally connecting at least some thereof to at least some of said roof truss assemblies to permit relative vertical movement of the latter in said raising or lowering.

2. A shelter structure of the type described, comprising a longitudinally spaced series of upright side truss assemblies having means to anchor the same to the ground in parallelism with one another, a longitudinally spaced series of roof truss assemblies in transverse alignment with the respective side truss assemblies, said roof truss assemblies having lift truss units articulating the same adjacent an outer end thereof in parallelism with one another for the co-ordinated raising or lowering of the roof truss assemblies relative to the side truss assemblies, said lift truss units having hinge means pivotally connecting at least some thereof to at least some of said roof truss assemblies to permit relative vertical movement of the latter in said raising or lowering, each of said side and roof truss assemblies comprising at least two prefabricated sub-assemblies having quick release pin means to couple the same together on the ground as components of a unitary and rigid truss assembly, and lift devices associated with at least some of said side truss assemblies in the transverse zone of at least some of said hinge means, said lift devices being operatively connected to the roof truss assemblies for the raising or lowering of the latter attended by relative vertical movement of at least some thereof.

3. The shelter structure of claim 2, in which at least some of said side truss assemblies are provided with vertically progressive sight indicia permitting a check of the vertical position of the roof truss assemblies relative to one another in the raising or lowering thereof by visual reference to the same and the respective side truss indicia.

4. The shelter structure of claim 2, in which said side and roof truss assemblies are provided with means adjacent the top of the former to effect a quick release coupling thereof to one another when said roof truss assemblies have been fully raised by operation of said lift devices.

5. The shelter structure of claim 4, in which said quick release coupling comprises a coupling pin, said side and roof truss assemblies being respectively provided with elongated slots at 90° to one another for the releasable reception of the pin when said slots are in alignment with one another.

References Cited

UNITED STATES PATENTS

| | | | |
|---|---|---|---|
| 1,600,749 | 9/1926 | Barnes | 47—21 |
| 2,497,596 | 2/1950 | Frieder et al. | 135—1 |
| 3,058,549 | 10/1962 | Anderson | 52—643 |
| 3,172,507 | 3/1965 | Blyueis | 52—690 |

FOREIGN PATENTS

| | | |
|---|---|---|
| 132,863 | 9/1919 | Great Britain. |
| 365,671 | 10/1938 | Italy. |

FRANK L. ABBOTT, *Primary Examiner.*

S. D. BURKE, *Assistant Examiner.*

U.S. Cl. X.R.

52—126, 640, 643, 690